May 28, 1935.  E. A. McBRIDE  2,002,641
TWO MATERIAL EXTRUDED VALVE AND METHOD OF MAKING THE SAME
Filed Feb. 13, 1931
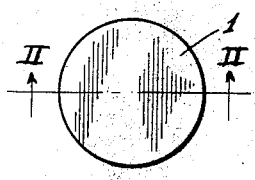
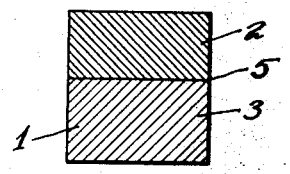
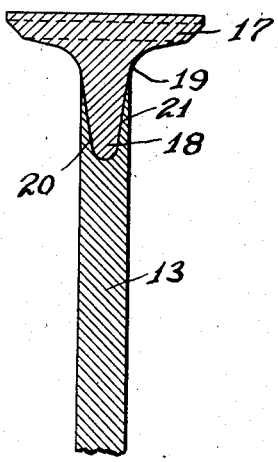
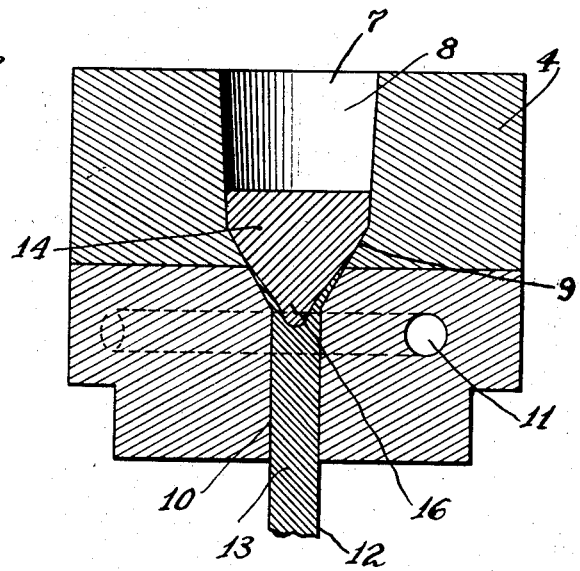
Inventor
Eugene A. McBride
by Charles Axfield  Attys.

Patented May 28, 1935

2,002,641

UNITED STATES PATENT OFFICE 2,002,641

TWO MATERIAL EXTRUDED VALVE AND METHOD OF MAKING THE SAME

Eugene A. McBride, Cleveland, Ohio, assignor to Thompson Products, Incorporated, Cleveland, Ohio, a corporation of Ohio Application February 13, 1931, Serial No. 515,536

13 Claims. (Cl. 29—156.7)

This invention relates to the method of forming a composite metal article and more particularly to the method of producing a poppet valve having a head portion and a stem portion of different metals.

It is an object of this invention to produce a valve having a head portion and a stem portion of different metals by a method according to which two metal blanks are welded together and the resulting member is extruded.

It is a particular object of the present invention to produce a valve having a head of one metal and a stem of another metal by a method in which the metal blank for forming the head is welded to the metal blank for forming the stem and the composite blank is heated to a forging temperature and extruded and later formed into a completed valve.

These and other objects of this invention will become apparent from the following description and appended claims.

This invention (in a preferred form) is illustrated in this specification and the accompanying drawing which forms a part thereof.

On the drawing:

Figure 1 is a plan view of a composite metal blank to be used in the making of a valve;

Figure 2 is a vertical cross section taken on line II—II of Figure 1;

Figure 3 is a vertical cross section of a die block showing a partly extruded blank therein;

Figure 4 is a sectional view of a completed valve.

As shown on the drawing:

In carrying out this invention, a composite metal blank I formed by welding the metal forgings 2 and 3 together is heated to forging temperature and placed in a die block 4. The metal 2 is preferably a hard steel such as high chrome steel, and the metal portion 3 is made of a softer steel such as chrome-nickel steel. The forgings are preferably disc shaped and are welded together along adjacent circular surfaces as shown at 5.

The composite block I thus formed is heated to forging temperature and placed into the recess 7 of the die block 4.

The recess 7 comprises an enlarged slightly converging portion 8 which extends into the die block for a distance approximately equal to the length of its diameter. At its lower end the recess 8 merges into a frusto-conical portion 9. A cylindrical opening 10 having a diameter equal to the diameter of the smaller end of the frusto-conical section 9 extends the remaining distance through the die block. It will thus be seen that recess 7 is generally funnel shaped. A passageway 11 is provided in the die block adjacent the frusto-conical portion 9 for passing a cooling medium therethrough.

A pressure is exerted against the top of the blank I which causes a part of the metal to be extruded through the opening 10 to form a headed member 12. By exerting the proper pressure the metal forging 3 will be drawn out and formed into the stem 13, and the metal forging 2 will be formed into a head 14 with a small neck portion 16 extending into the stem. This operation tends to complete the weld between the two metals.

The headed member or unfinishd valve 12 thus formed is cooled and removed from the die. The member 12 is reheated to forging temperature and the head worked into the desired shape. This may be accomplished by any of the known methods, but preferably by coining. In this operation, the head portion 9 is spread out to form a disc shaped head 17 having a neck 18 extending axially therefrom.

The neck 18 is finished so as to converge toward the stem 13, one end of the neck merging into the head 17 as shown by the curve 19 and the other end being received in the cone-like recess 20 in the stem 13. The wall 21 of the recess 20 is permanently welded to the neck 18.

It will be seen that I have provided by this invention, a form of composite valve which is made by a method which is simple, inexpensive and very efficient for use in quantity production.

Many changes may be made in the choice of material and in the shape of the parts and I do not wish to be limited otherwise than is necessary by the prior art and the scope of the appended claims.

I claim as my invention:

1. The method of forming a composite valve comprising welding a disc of one metal to a disc of another metal along adjacent surface portions, heating the block thus formed to forging temperature and forcing it through a funnel shaped die so as to form a member having a head and stem thereon the pressure exerted being sufficient to form the one metal into a stem and the other metal into a head, removing the member thus formed from the die and reshaping the head so as to form a completed valve.

2. The method of fabricating a composite metallic headed member, which comprises welding together discs of two different metals and extruding the composite disc thus formed to form a stem largely of one metal and a head of the other metal, the surface of weld being distorted to extend into the stem.

3. The method of fabricating a composite metallic headed member which comprises extruding a blank formed of two different metals through a die to form a stem of one metal and a head of the other metal of the blank.

4. The method of forming composite metallic headed articles, which comprises welding together billets of different metals having the desired characteristics and the requisite mass for forming the head and stem respectively of the article, and extruding the composite billet to provide a stem largely composed of one of the metals and a head composed of the other of said metals with the metal of the head extending axially into the metal of the stem and surrounded thereby.

5. The method of forming composite metallic headed articles which comprises welding together two slugs of forgings having the desired characteristics and the requisite mass for forming the head and stem respectively of the article, and extruding the resulting composite billet to form an elongated stem composed of the one metal and a head composed of the other metal, the metal of the head forming a neck that extends into and merges inseparably with the metal of the stem.

6. A poppet valve having a head and neck composed largely of one metal and having a stem composed largely of a metal of different characteristics, said valve having been formed from a composite metal billet by shaping the metal of one portion of the billet to form an elongated stem and by shaping the metal of the other portion of the billet to form a head with a tapered neck portion extending therefrom into the stem and merging with the metal of said stem.

7. The method of fabricating a valve, which comprises welding together two forgings of metals having different characteristics, extruding the composite metal blank thus formed to form a member having a head consisting largely of one metal and a stem consisting largely of the other metal and reforging the head to substantially finished shape.

8. The method of fabricating a valve, which comprises welding a disk of one metal to a disk of another metal, extruding the composite blank thus formed through a conical-shaped die to thereby form a member having a head of one metal and a stem of the other metal and reforging the head of said member to the shape of a finished valve.

9. The method of making a composite metal valve, which comprises welding two pieces of different metals together, forcing the composite metal blank through a funnel-shaped die to form one metal into a head and the other metal into a stem integral therewith and reforging the metal of the head to the shape of a finished valve head.

10. The method of making a valve, which comprises welding two metal disks of different characteristics and forcing the composite disks thus formed into and through a funnel-shaped die to form a headed member having a stem largely composed of one metal and a head completely composed of the other metal.

11. The method of making a composite metallic valve, which comprises welding a disk of metal having suitable characteristics for forming the head of a valve to a disk of a different metal having suitable characteristics for forming the stem of the valve, heating the composite disk to forging temperature, placing said disk in a funnel-shaped die, and exerting sufficient pressure on the disk to force it through said die and form it into a member having a head and stem thereon formed of the respective metals.

12. A composite metal valve comprising a head of one metal having an integral tapered neck portion extending axially therefrom, a stem formed of a different metal surrounding said tapered neck portion to define an enlarged curved area around the tapered neck portion, and a weld joining said neck and stem throughout said entire curved area.

13. A composite metal valve having a stem portion of one metal integrally united to a head portion of another metal characterized by the head portion welded to the stem over an enlarged curved area lying within the stem portion to impart strength to the connection between the head and stem.

EUGENE A. McBRIDE.